United States Patent Office 3,405,947
Patented Oct. 15, 1968

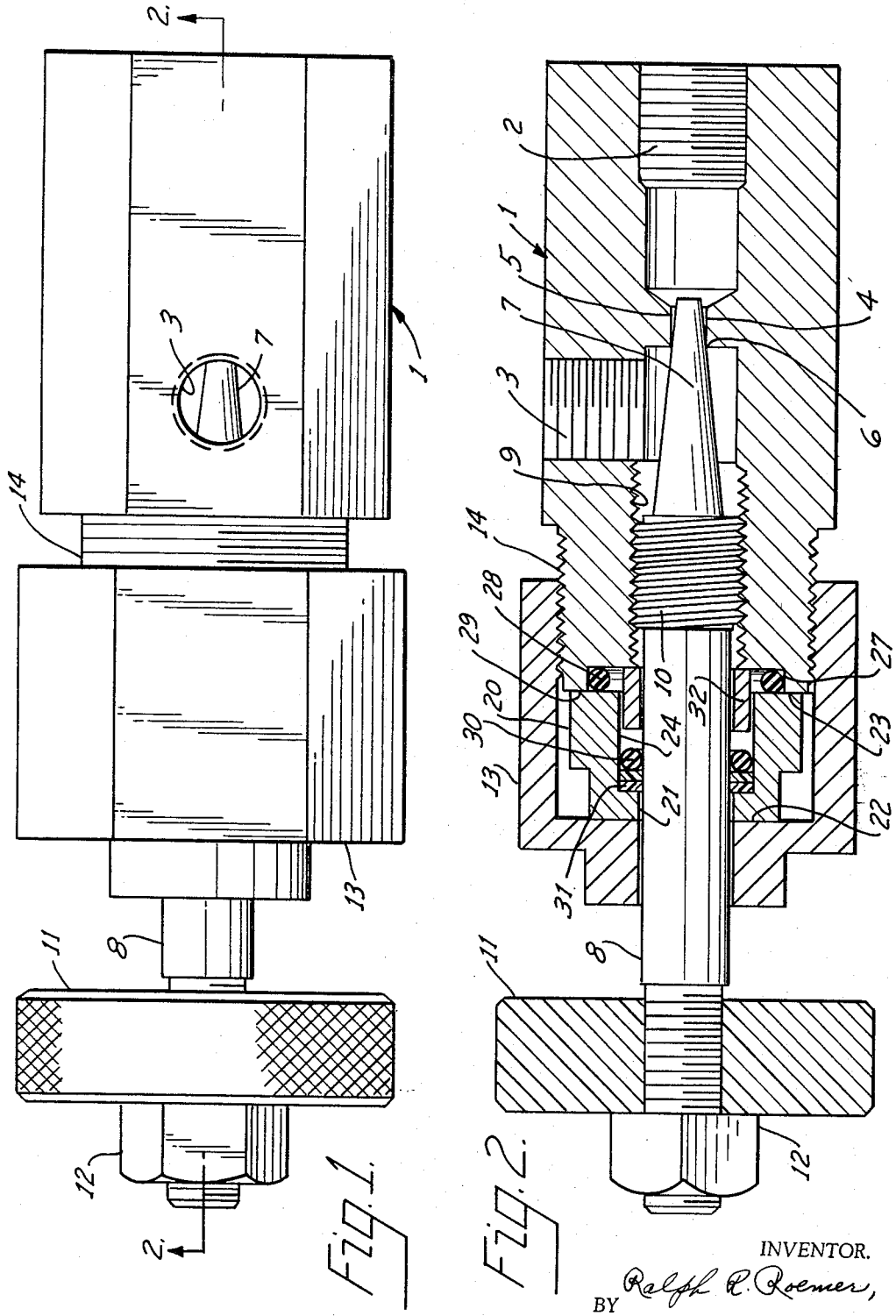

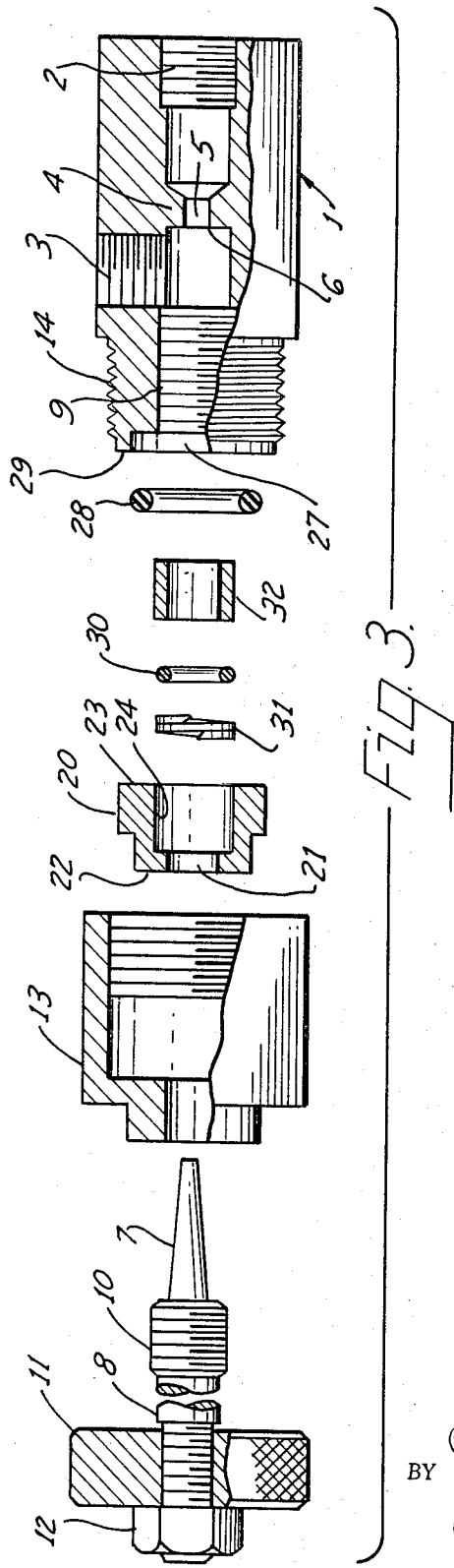

3,405,947
SEALING MEANS FOR A HYDRAULIC
SYSTEM
Ralph R. Roemer, 2100 Vega Ave.,
Cleveland, Ohio 44113
Filed Feb. 9, 1966, Ser. No. 526,086
3 Claims. (Cl. 277—110)

ABSTRACT OF THE DISCLOSURE

A sealing means for a hydraulic system in which a body with an internal cavity connected in the hydraulic system has an operating stem which extends from the cavity to the exterior of the body through a closure gap forming part of the body. A holder within the cavity surrounds the stem and holds in place two O-ring seals, one of which prevents escape of pressure fluid from the cavity around the inner end of the holder and the other of which prevents the escape of pressure fluid from the cavity between the holder and stem. The stem has a threaded portion in the cavity in threaded engagement with the body for causing movement of the stem upon rotation of the stem. A sleeve is disposed around the stem between the threaded portion of the stem and the O-ring sealing the space between the stem and holder so as to prevent the threaded portion of the stem from engaging and damaging the latter O-ring.

This invention relates to a sealing device for high pressure control valves used for controlling the flow of fluids, and is an improvement in the sealing device disclosed and claimed in my co-pending application Ser. No. 284,477, filed May 31, 1963, now Patent No. 3,260,499, and entitled High Pressure Control Valve.

For the purposes of illustration, the invention will be described as applied to a hand manipulated or settable needle valve, its application to other valves being apparent from the illustrative example.

The principal object of the present invention is to simplify the valve sealing device disclosed in my co-pending application by eliminating a number of the parts thereof without reducing the effectiveness thereof.

Various specific objects and advantages will become apparent from the following description wherein reference is made to the drawings, in which:

FIG. 1 is a front elevation of a valve incorporating the sealing device of the present invention;

FIG. 2 is a vertical axial sectional view through the valve and sealing device illustrated in FIG. 1, and is taken on the line 2—2 thereof; and FIG. 3 is a reduced exploded view showing the parts of the valve and sealing device in alignment, but unassembled.

Referring to the drawings, which illustrate the device as incorporated in a needle valve, the valve comprises a hollow element 1 having at one end an inlet 2 and an outlet 3 in communication with the body cavity, the inlet and outlet being threaded for connection to suitable pipe lines or equipment.

Within the body cavity between the inlet 2 and outlet 3 is a partition wall 4 having a passage therethrough communicating with the inlet and outlet and provided at one end of the passage with an annular seat 6 for cooperation with the valve plug 7.

In the form illustrated, the plug 7 is frusto-conical with its smaller base disposed in the passage 5.

In order to move the valve plug into and out of seating relation to the seat 6 and thus to open and close the valve and control the flow, a stem 8 is provided. The stem 8 is mounted in the body for movement axially thereof toward and away from the seat. The stem preferably is rigid with, and coaxial with, the plug. Suitable means are provided for moving the stem axially. As illustrated, they may comprise an internally threaded bore 9 in the body coaxial with the seat 6, and an externally threaded portion 10 on the stem cooperable with the threads of the bore 9 for advancing and retracting the stem axially consequent upon rotation of the stem in opposite directions, respectively. The stem is provided at its outer end with a suitable handle 11 held in place by a nut 12. Other means may be used for operating the stem for controlling the valve means and thereby the flow through the valve.

The other end of the body is shown as being in the form of a suitable compression cap 13 which is arranged to be connected to the remainder of the body for adjustment in a direction axially of the stem. For this purpose the cap is internally threaded near its open end and is in threaded engagement with an externally threaded portion 14 on the hollow element so that upon rotation of the cap it may be advanced axially of the hollow element in a direction toward the seat or retracted therefrom.

The present sealing device is to prevent the escape of fluid along the peripheral wall of the stem and out through the end wall of the cap of the body and between the threads of the hollow element and cap, and employs a number of the parts of the device of my co-pending application. Among these are an O-ring holder 20 having a central bore 21 through which the stem 8 extends and wherein it is accommodated with the usual slight operating clearance for both axial and rotative movement relative to the O-ring holder.

The holder has an outer end wall 22, an inner end wall 23, and a counterbore 24. The counterbore 24 is of larger diameter than the bore 21 and is open at the inner end wall 23 of the holder, thus facing in a direction generally toward the seat in the body cavity.

The threaded portion 14 of the hollow element has an internal counterbore 27 in which is accommodated an O-ring 28. The portion of the hollow element in which the counterbore 27 is provided terminates axially at the open end of the counterbore 27 in an annular end surface or shoulder 29 facing toward the holder 20.

The structure thus far described is fully disclosed in my above-identified co-pending application.

In accordance with my present invention, a single elastomeric O-ring 30 is disposed in the counterbore 24, and conventional spiral back-up rings 31 of Teflon or the like are disposed in the counterbore between the end wall thereof and the O-ring 30. The holder 20 is of sufficient outer diameter at the end adjacent the shoulder 29 so that the peripheral margin of its inner end wall 23 engages the shoulder 29 of the body and seats firmly thereon. Thus, in the operating position of the holder 20, the O-ring 28 is disposed in operating position between the end wall of the counterbore 27 and the inner end wall 23 of the holder.

A cylindrical sleeve member 32 is provided and is in coaxial relation to the stem 8 and the bore 24, and embraces the exterior wall of the stem, and is embraced by the wall of the bore 24, with operating clearance.

At its innermost end, axially of the stem, it can engage the bottom wall of the body counterbore 27 and, when so engaged, its outermost end lies within the counterbore 24 in spaced relation axially to the O-ring 30.

The sleeve member 32 constrains outward axial movement of the stem 8 to an extent such that the threads on the stem cannot engage and damage the O-ring 30 as the stem is rotated to open the valve.

With the arrangement described, a channeled part interposed between the holder and body and an O-ring used in the channel thereof, as taught in my copending application, are eliminated.

When the cap 13 is screwed onto the hollow element in a direction toward the seat, its inner end wall engages the annular outer end wall 22 of the holder 20 and exerts a pressure thereon in a direction toward the seat. The annular margin of the inner end wall 23 of the holder 20 engages the shoulder 29 of the hollow element which preferably is of greater external diameter than the external diameter of the inner end wall of the holder 20. Due to engagement of the cap 13 with the end wall 22, and engagement of the inner end wall 23 of the holder 20 with the shoulder 29, the amount of compression of the O-rings is predetermined. The dimensions are preselected so that the compression is in accordance with O-ring engineering practices.

When the valve is closed, of course, there is no problem of leakage of fluid. However, when the valve is partially or fully open and the outlet is connected to apparatus wherein extremely high pressure is maintained in the valve body, the fluid seeks to flow past the seat through the adjacent part of the body and then in the space between the threaded portion 9 of the body and the threads 10 of the stem. Passing the threaded portion 10 of the stem, it continues to creep along the stem until it reaches the O-ring 30 which prevents it from escaping and passing further along the stem toward the outer end of the stem.

However, when the fluid is thus constrained by the O-ring 30, it tends to leak out of the body, including the cap portion thereof, between the threads of the cap and complementary threads 14 on the hollow element. Any fluid tending to escape radially outwardly from the counterbore 27 applies outward pressure to the O-ring 28 which is already stressed somewhat between the bottom of the counterbore 27 and the inner end wall 23 of the holder 20. This pressure, of course, tends to force the O-ring 28 more firmly into seating engagement with the end wall of the counterbore 27, the inner end wall 23 of the holder 20, and the peripheral wall of the counterbore. Thus no fluid can escape between the inner end of the holder 20 and shoulder 29. Accordingly an effective seal is provided between the cap 13 and stem 8 and between the cap 13 and hollow element 1. Generally the handle 11 is calibrated with a circumferential row of indicia so that it is known how wide the needle valve is to be open for a given flow at a given pressure to which the valve is going to be subjected. This setting is usually made when the pump delivery pressure is reduced or stopped, as the binding of the O-ring 30 under extremely high pressure makes it difficult to rotate the valve stem, and the rotation of the stem while the pressure is high would cause abrasion and damage to the O-ring 30.

When the valve is closed, it can, of course, be seated sufficiently tightly so that no pressure fluid escapes past the seat.

Having thus described my invention, I claim:

1. A sealing means for a hydraulic system which comprises a hollow body, including a hollow element and a cap, said body being connectable internally to a source of fluid under high pressure and wherein a cylindrical actuator stem, having a threaded portion, extends into the body from the exterior thereof and is threadably engaged with interior threads in the body so as to be movable axially relative to the body upon rotation of the stem, and wherein the body has an interior sealing wall coaxial with the stem and facing toward the outer end of the stem, and has an annular wall portion disposed outwardly from the interior sealing wall and coaxial therewith;

said sealing means comprising;

an annular holder adapted to be accommodated in the body and having an inner end wall in axially spaced relation to said interior wall in a direction toward said outer end of the stem and in surrounding relation to, and axially movable relation to, the stem and having an inner end wall adapted to engage said annular wall portion;

a first O-ring at the inner end wall of the holder and adapted to lie between and in resilient sealing engagement with said inner end wall and said interior wall in radially outwardly spaced relation to, and axially movable relation to, the stem;

said holder having an axial bore which is open at the inner end of the holder, and is of less diameter than the said O-ring and which has a bottom wall facing toward said interior wall;

a second O-ring in the axial bore in engagement with the peripheral wall of the bore and adapted for resilient sealing engagement with the periphery of the stem;

and said holder being adapted to have force exerted thereon by the cap of the hollow element in a direction axially inwardly of the stem for retaining said inner end portion of the holder in endwise engagement with the surrounding wall portion of the hollow element for thereby retaining the first O-ring in its resilient sealing engagement;

characterized in that an annular sleeve of less external diameter than the internal diameter of the first O-ring is provided, and lies partially within said axial bore of the holder and fits the wall of the axial bore with operating clearance, the internal diameter of the sleeve being less than the external diameter of the threaded portion of the stem.

2. A structure according to claim 1 wherein a portion of the sleeve extends axially outwardly beyond the inner end of said axial bore, and said sleeve has an inner end adapted to engage said interior wall of the hollow element, an outer end disposed in the axial bore in spaced relation axially relative to the second O-ring when the inner end of the sleeve is in position to engage said interior wall.

3. A structure according to claim 1 wherein the inner end wall of the holder and said inner end portion of the holder are coplanar, and provide an annular wall extending from the inner periphery to the outer periphery of the holder.

References Cited
UNITED STATES PATENTS

| | | | |
|---|---|---|---|
| 1,780,764 | 11/1930 | Noble | 277—123 |
| 2,757,053 | 7/1956 | Green | 277—2 X |
| 2,985,473 | 5/1961 | Parker | 277—97 |
| 3,059,937 | 10/1962 | Wettstein | 277—110 |

SAMUEL ROTHBERG, *Primary Examiner.*